United States Patent [19]

Haworth

[11] 4,377,267
[45] Mar. 22, 1983

[54] VORTEX TRANQUILIZER

[75] Inventor: Floy Haworth, Monett, Mo.

[73] Assignee: Juanita June Haworth, Monett, Mo.

[21] Appl. No.: 224,166

[22] Filed: Jan. 12, 1981

[51] Int. Cl.³ .............................................. B64C 3/58
[52] U.S. Cl. ................................................ 244/199
[58] Field of Search ............... 244/198, 199, 200, 130, 244/91

[56] References Cited

U.S. PATENT DOCUMENTS

| | | | |
|---|---|---|---|
| 2,074,201 | 3/1937 | Bechereau | 244/91 |
| 3,199,813 | 8/1965 | Roper | 244/130 |
| 4,108,403 | 8/1978 | Finch | 244/199 |

FOREIGN PATENT DOCUMENTS

| | | | |
|---|---|---|---|
| 850918 | 12/1939 | France | 244/91 |
| 1250511 | 12/1960 | France | 244/91 |

Primary Examiner—Galen L. Barefoot

[57] ABSTRACT

The purpose of this invention is to influence the behavior of the airflow near the wingtip, where the higher pressure air from below the wing swirls up over the end of the wing, to arrive at the lower pressure area above the wing. This process will be discouraged because of the high degree of drag it creates and the flow of air rearward will be encouraged. This flow should continue as smooth as possible to the trailing edge of the wing and up and out to the pencil point end of the appendants.

1 Claim, 4 Drawing Figures

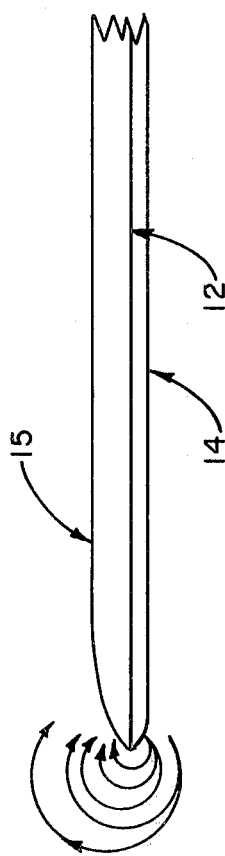
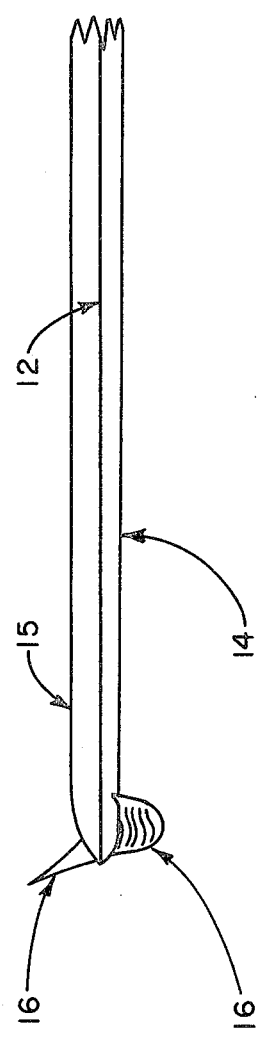
FIG. 1
FIG. 2

VORTEX TRANQUILIZER

SUMMARY

Much of the undesirable behavior of airflow around, over or under parts of the aircraft, are reactions to the designs attempt to attain a desirable reaction. For instance, most of the resistance to an aircraft high speed travel is the drag that is a reaction caused by the airfoils success in developing lift. In the same manner, things can be done to influence these reactions by attaching comperative small devices at strategic points that would only attain this ability to influence at rather high speeds and would reduce the problem by producing a counter action.

BRIEF DESCRIPTION

FIG. 1. A wingtip, front view indicating the problem.
FIG. 2. A wingtip, front view with appendants.
FIG. 3. Wingtip viewed from the bottom with appendants.
FIG. 4. Side view of wingtip with appendants. A cross section view of appendants at various points along its length.

DETAILED DESCRIPTION

Figure 3:
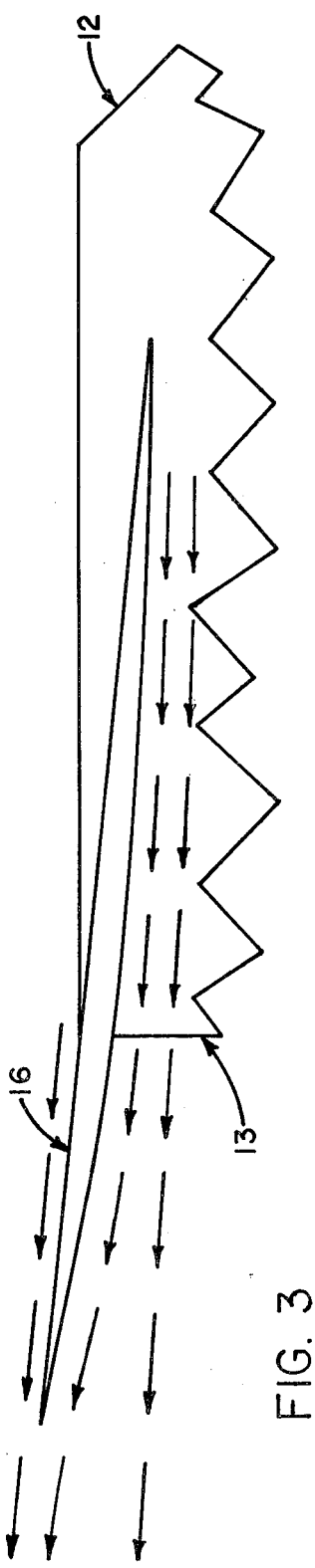

FIG. 1 is a headon view of a wingtip illustrating the problem which the invention is designed to reduce. 12 is the leading edge of the wing and the drawing shows the dense air from the lower wingtip surface 14 swirling over the end of the wingtip seeking the area of less dense air on the upper surface 15 of the wingtip. This swirl gets more intense as it approaches the trailing edge of the wingtip and as speed and/or load is increased. The drag created by this turbulence can be quite substantial. The purpose of this device is to discourage the swirl by establishing a thin blade type barrier, attached smoothly and snugly to the underside of the wingtip and close to the end of the wingtip and running fore to aft as FIG. 4-1 and FIG. 4-2 shows. This will be done beginning at a point where the wingtip has just reached maximum thickness and when the wingtip begins to taper toward the trailing edge, the barrier will evolve into a mild airfoil attached smoothly to the bottom surface of the wingtip running fore to aft and with its convex side inboard designed to create a less dense air area inboard of the device, and progressively less dense toward the trailing edge of the wing, encouraging the airflow to move rearward to the trailing edge of the wing and discouraging the swirl over the end of the wingtip. Its curve will be very gradual with the device 16 being slightly nearer the end of the wing at the trailing edge 13, as in FIG. 3, which also shows the bending of the airflow causing the less dense air rearward. Its effectiveness will become stronger as speed is increased, as the need for its reaction will also increase. However, to prevent counter productive reactions at high speeds, the curvatures and angle of attack of the device should be very subtle.

Figure 4:
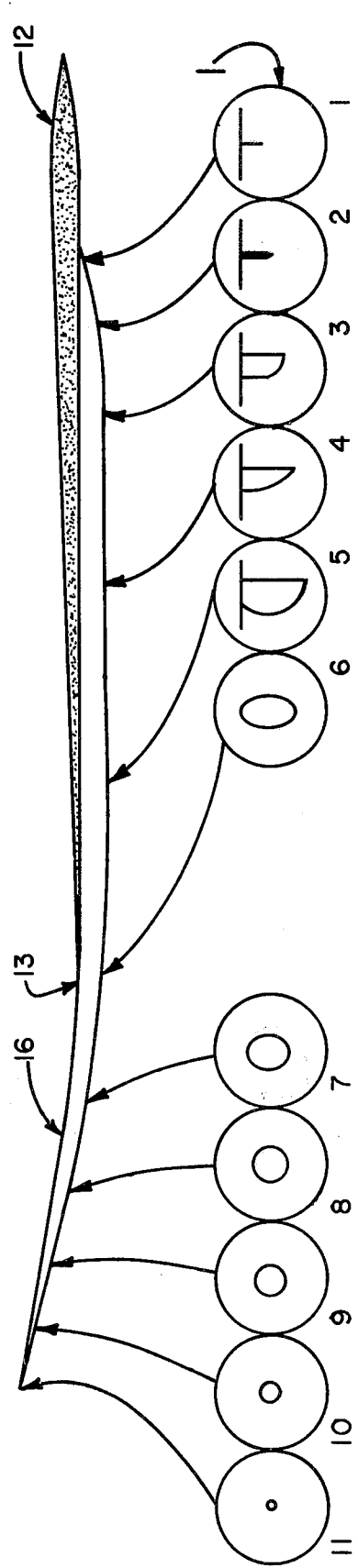

The device has a straight outboard surface when viewed from directly below and as seen in FIG. 3. And to lead the remaining turbulence upward, outward and rearward to a point where its effect will be diminished, the device 16 will continue and extend behind the trailing edge 13 of the wing and will gradually become round in shape and to a point as in FIG. 4 numbers 7, 8, 9, 10 and 11. Also the curve will continue up and outward to said point. Numbers 3, 4, 5 and 6 shows cross sections at points indicated.

FIG. 2 is an attempt to show the appendants position on the wingtip as viewed from the front. The left wingtip will have a similiar device with the obvious differences. They will not be interchangeable. Size will vary for different applications. So until experience indicates a better rule the lower boundary of the device will extend downward from the lower surface of the wingtip approximately the same distance as the wingtip is thick at FIG. 4-1. Approximately one third of its total length will extend rearward from the trailing edge of the wingtip.

I claim:

1. In a heavier than air aircraft having wings, the improvement being a vortex drag reducing device that reduces drag by said device acting as a barrier fore to aft on the wingtips lower surface to discourage lateral or oblique movement of air at said wingtips, and the air retained on the inboard side of said barrier moves rearward along a convex curved inboard surface of said device which produces progressively less dense air rearwardly to provide a path of least resistance rearwardly which influences the airflow to move smoothly from the leading edge to the trailing edge of the wingtip, where remaining turbulent airflow is led rearward and upward by the portion of said device extending rearward from the trailing edge of the wingtip, said device being:

smoothly and securely attached to the lower surface of the wingtip; positioned fore to aft near the outer end of said wingtip; with a straight outboard surface when viewed from directly below; with a fore to aft mildly convex curved inboard surface when viewed from directly below, said inboard surface joins the lower surface of the wingtip at a right angle; the outboard surface is rounded, smoothed and streamlined and the inboard surface of said device remains vertically flat along its length until said device extends rearward from the trailing edge of the wingtip, then said extended portion of said device is tapered uniformly; said device is positioned with its most forward point at a location where the wingtip has maximum thickness;

the leading edge of said device angles downward abruptly from the wingtips lower surface until said device has attained full height, with said height being substantially equivalent to the thickness of the wingtip at this point, and said angled leading edge is knife sharp; approximately one third of the total length of said device forms an extension rearward from the trailing edge of the wingtip and said extension of said device curves upward and tapers to a pencil sharp point.

* * * * *